A. HELLA.
RETAINING MEANS.
APPLICATION FILED MAR. 21, 1913.
1,140,036.
Patented May 18, 1915.
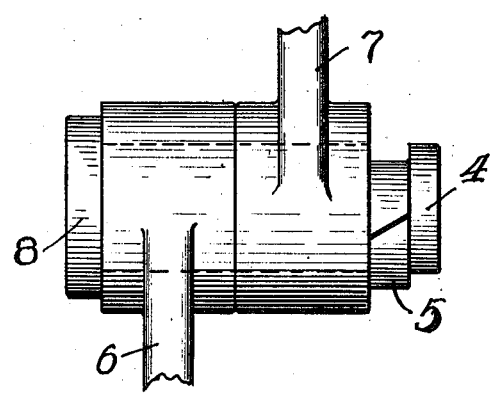
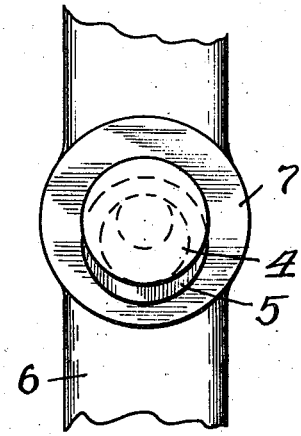
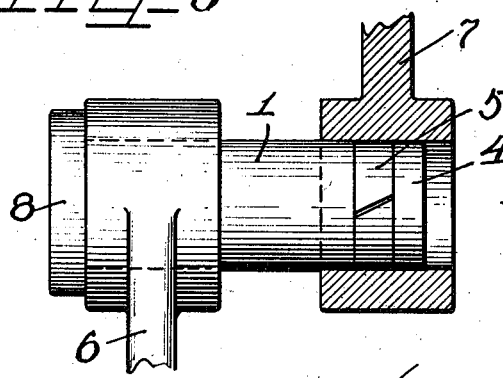
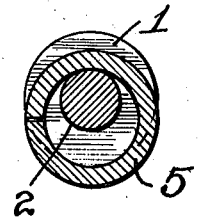
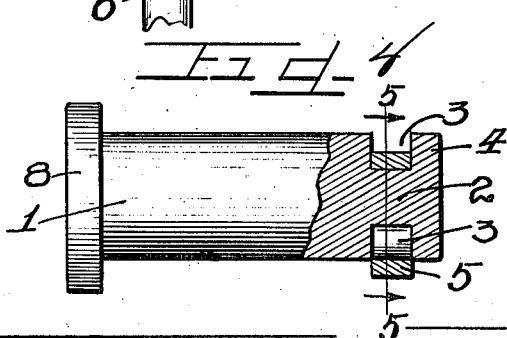
Witnesses
J W Angell
Charles W Hill Jr
Inventor
Anton Hella
by Charles W Niess
Atty

UNITED STATES PATENT OFFICE.

ANTON HELLA, OF CHICAGO, ILLINOIS.

RETAINING MEANS.

1,140,036.  Specification of Letters Patent.  Patented May 18, 1915.

Application filed March 21, 1913. Serial No. 755,862.

*To all whom it may concern:*

Be it known that I, ANTON HELLA, a citizen of the United States, and a resident of the city of Chicago, in the county of Cook and State of Illinois, have invented certain new and useful Improvements in Retaining Means; and I do hereby declare that the following is a full, clear, and exact description of the same, reference being had to the accompanying drawings, and to the numerals of reference marked thereon, which form a part of this specification.

Heretofore when it has been desired to retain loosely engaged members on a bolt or shaft in order to provide a means whereby said members might be easily removed, retaining means such as threaded nuts, cotter pins or split pins, and the like have been used suitably associated with washers for the purpose. Where retaining means are used requiring the removal or detachment thereof from the shaft before the member engaged on the shaft may be removed, such an operation necessitates a great loss of time and inconvenience, and furthermore the retaining means may be lost when so removed, which may at times prove of serious consequence.

This invention relates to a device wherein the retaining means is constantly associated with its bolt or shaft and cannot be removed therefrom, but will permit rapid engagement on the shaft or disengagement therefrom of members, the retaining means falling instantly into locking position after such operation in each case.

It is an object of this invention to provide a bolt or shaft with a retaining member constantly associated therewith and adapted to automatically fall into locking position after an element has been slipped on or off said shaft or bolt.

It is also an object of this invention to provide a retaining member, which, when moved into concentric relation with the shaft on which it is attached, will permit the shaft supported elements to be moved on or off the shaft and when in eccentric relation with said shaft, will serve effectually to prevent such movement of said elements.

It is furthermore an object of this invention to provide a ring loosely engaged in a grooved portion of the shaft, the outside diameter of said ring being the same or of smaller diameter than the shaft to permit the insertion of elements thereover onto the shaft when so desired, and acting to retain the same thereon.

It is finally an object of this invention to construct a simple device of durable construction and readily adaptable to practically any type of shaft, bolt or the like.

The invention (in a preferred form) is illustrated in the drawings, and hereinafter more fully described.

In the drawings: Figure 1 is a front elevation of a stud shaft having elements pivotally retained thereon by a device embodying my invention. Fig. 2 is an end elevation thereof. Fig. 3 is a view partly in section, showing the operation of the device as an element is slipped on or off the shaft. Fig. 4 is a view of a stud shaft partly in section, and showing a locking device thereon in locking position. Fig. 5 is a section on line 5—5 of Fig. 4.

As shown in the drawings: 1, indicates a stud shaft or bolt which, near one end is turned to a smaller diameter affording a neck portion 2, surrounded by the peripheral groove 3, one side of which, in this case, is formed by the integral cap or extended portion 4, of the same diameter as the stud shaft. Engaged in said groove 3, is a ring 5, the outside diameter of which is the same or less than that of the stud shaft, and the inside diameter of which is greater than that of the neck portion 2, of the stud shaft. The ring 5, may be constructed and attached to the stud shaft in any suitable manner, such as for instance a split ring or collar properly sprung into said groove.

For convenience of illustration, the elements engaged on the stud shaft have been shown in Figs. 1, 2, and 3, as levers, the inner one 6, of which bears against the integral flanged head 8, of the stud shaft, and the other 7, of which is retained in position by the locking or retaining ring 5.

The operation is as follows: When it is desired to move one of the elements on or off of the stud shaft or bolt 1, the ring 5, is moved into concentric relation with said shaft, and as shown more particularly in Fig. 3, the element in this case designated as 7, is thereby readily slipped over the ring, and removed or engaged on the shaft, as the case may be. When such an element has passed beyond on either side of said ring 5, the ring drops into the eccentric position, which will prevent engagement or disengagement of an element on said shaft.

For convenience of illustration I have shown the adaptation of the device in the simplest manner possible.

I am aware that details of construction may be varied through a wide range without departing from the principles of this invention, and I therefore do not purpose limiting the patent granted otherwise than necessitated by the appended claim.

I claim as my invention:

In a device of the class described a shaft having a peripheral groove therein, and a rotatable ring permanently and loosely engaged around the shaft in said groove and adapted to move from a concentric position relative to the shaft in any direction radially of the shaft without rotating into locking position to prevent movement of elements on or off said shaft, the outer diameter of said ring being not greater than the diameter of said shaft permitting insertion of elements thereover upon said shaft, when the ring is in a concentric position thereon.

In testimony whereof I have hereunto subscribed my name in the presence of two subscribing witnesses.

ANTON HELLA.

Witnesses:
CHARLES W. HILLS, Jr.,
LEON M. REIBSTEIN.